US008463445B2

(12) United States Patent
Kumar et al.

(10) Patent No.: US 8,463,445 B2
(45) Date of Patent: Jun. 11, 2013

(54) METHOD AND SYSTEM FOR SAFE DRUM WATER LEVEL DETERMINATION IN A COMBINED CYCLE OPERATION

(75) Inventors: Rajeeva Kumar, Clifton Park, NY (US); Erhan Karaca, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 299 days.

(21) Appl. No.: 12/789,847

(22) Filed: May 28, 2010

(65) Prior Publication Data
US 2011/0295432 A1 Dec. 1, 2011

(51) Int. Cl.
*G05D 9/00* (2006.01)

(52) U.S. Cl.
USPC ........... 700/281; 702/55; 122/448.1; 137/386

(58) Field of Classification Search
USPC  700/281–282, 28; 702/55; 73/1.73; 137/386, 137/453–454; 122/448.1
See application file for complete search history.

(56) References Cited

U.S. PATENT DOCUMENTS

| 3,310,039 | A |   | 3/1967  | Holt             |         |
|-----------|---|---|---------|------------------|---------|
| 4,353,204 | A |   | 10/1982 | Arakawa          |         |
| 4,457,266 | A |   | 7/1984  | La Spisa         |         |
| 4,552,099 | A | * | 11/1985 | Martens et al.   | 122/451.1 |
| 4,555,906 | A | * | 12/1985 | Martens et al.   | 60/660  |
| 4,656,335 | A |   | 4/1987  | Durrant et al.   |         |
| 4,735,043 | A |   | 4/1988  | Hamill et al.    |         |
| 4,802,446 | A |   | 2/1989  | Triggs           |         |
| 4,854,121 | A | * | 8/1989  | Arii et al.      | 60/39.182 |
| 4,969,324 | A | * | 11/1990 | Woodson          | 60/775  |
| 5,249,551 | A |   | 10/1993 | Kirkpatrick      |         |
| 5,406,915 | A | * | 4/1995  | Kirpatrick       | 122/487 |
| 5,559,293 | A | * | 9/1996  | Kirkpatrick      | 73/861  |
| 5,771,846 | A | * | 6/1998  | Ruchti           | 122/451 R |
| 6,477,842 | B1| * | 11/2002 | Nagata et al.    | 60/772  |
| 6,510,739 | B1| * | 1/2003  | Ollat et al.     | 73/579  |

(Continued)

FOREIGN PATENT DOCUMENTS

DE  3006222 A1  9/1980
EP  2194319 A1  6/2010

OTHER PUBLICATIONS

Masakazu Shirakawa, Masashi Nakamoto and Shunji Hosaka; "Dynamic Simulation and Optimization of Start-up Processes in Combined Cycle Power Plants"; JSME International Journal Series B, vol. 48 (2005), No. 1 Special Issue on Experimental Mechanics in Heat and Fluid Flow pp. 122-128.

Pascal Fontaine and Jean-François Galopin; HRSG Optimization for Cycling Duty; Power Engineering Nov. 2007; 10 Pages.

Search Report and Written Opinion from corresponding EP Application No. 11167852.0-2321 dated Sep. 30, 2011.

*Primary Examiner* — Ramesh Patel

(74) *Attorney, Agent, or Firm* — Ann M. Agosti

(57) ABSTRACT

A method for controlling a water level of a drum of a heat recovery steam generation system for a combined cycle power plant is provided. The method includes determining an optimum drum water level during start up operation of the heat recovery steam generation system based on a characteristic chart model. The characteristic chart model is generated based on a plurality of vapor pressures of the drum and a plurality of temperatures of drum metal at the time of the start up operation of the heat recovery steam generation system.

15 Claims, 3 Drawing Sheets

U.S. PATENT DOCUMENTS

| | | | |
|---|---|---|---|
| 7,120,218 B2 * | 10/2006 | Srinivasan | 376/211 |
| 7,206,644 B2 | 4/2007 | Iino et al. | |
| 7,243,618 B2 * | 7/2007 | Gurevich | 122/7 R |
| 7,481,060 B2 * | 1/2009 | Haertel et al. | 60/775 |
| 2006/0248897 A1 * | 11/2006 | Haertel et al. | 60/775 |
| 2007/0084418 A1 * | 4/2007 | Gurevich | 122/1 B |
| 2009/0313997 A1 * | 12/2009 | Bayley et al. | 60/659 |
| 2010/0139392 A1 * | 6/2010 | Kumar et al. | 73/290 R |

* cited by examiner

METHOD AND SYSTEM FOR SAFE DRUM WATER LEVEL DETERMINATION IN A COMBINED CYCLE OPERATION

BACKGROUND

The invention relates generally to a combined cycle operation and more particularly, to a method and system for controlling a drum water level during start up operation of a heat recovery steam generation (HRSG) system for a combined cycle power plant.

Generally, the combined cycle power plant includes gas turbines, steam turbines and the HRSG systems. The HRSG systems are basically used for recovering heat in exhaust gases from the gas turbine and then using the recovered heat to produce and supply steam to the steam turbine. In general, the combined cycle power plant includes various kinds of water reservoirs such as boiler drum, dearator reservoir and condensor reservoir. Normally, the boiler drum provides a stable water supply to the HRSG system and accumulates heat energy for compensating for changes in the amount of steam generated or consumed in the power plant. The boiler drum water level control is critical for both plant protection and equipment safety and applies equally to high and low levels of water within the boiler drum. Additionally, a water vapor separator is especially provided inside the boiler drum so that wet steam may not be introduced into the steam turbine. Maintaining boiler drum water level within limits is important as exceedance will often lead to trips or damage the equipment used in the HRSG system.

Moreover, in a starting operation of the combined cycle power plant, the water level in the boiler drum rises abruptly. This start up drum level swell is because, when the water in the HRSG system is heated with the high temperature gas turbine exhaust gases, the temperature of the water in the HRSG system rises rapidly and evaporation starts suddenly. In this state, vapor phase and liquid phase coexist in the steam generator. Since the average specific volume ($m^3/kg$) of the water is very small compared to steam, this causes an abrupt water level rise in the boiler drum. This water level rise may exceed the highest water level allowed and thereby create a safety issue. Accordingly, when this water level rise happens, it is necessary to blow out the excessive water from the drum. However, the water level rise is so rapid that delicate controls are necessary to blow out the excessive water, otherwise safety problems are encountered especially in cases where the combined cycle power plant is periodically required to start up and shut down operation every day. Also, heat losses associated with blowing out the excessive water affects the efficiency of the combined cycle power plant.

Thus, to prevent the swelling phenomenon of the boiler drum the water level of the drum is lowered in advance of a plant start up operation. Generally, the water level of the boiler drum is controlled to approximately maintain a constant water level by adding water into or blowing water out of the boiler drum. However, the control of boiler drum water level is a challenging problem due to complicated dynamics of two-phase flows, the presence of waves, unknown heat and pressure disturbances and load demands.

Therefore, it is necessary to efficiently control the water level in a boiler drum during start up operation of the HRSG system for a combined cycle power plant.

BRIEF DESCRIPTION

In accordance with an embodiment of the invention, a method for controlling a water level of a boiler drum of a HRSG system for a combined cycle power plant during start up is provided. The method includes determining an optimum boiler drum water level during start up operation of the heat recovery steam generation system based on a characteristic chart model. The characteristic chart model is generated based on multiple vapor pressures of the boiler drum and multiple temperatures of boiler drum metal at the time of the start up operation of the HRSG system.

In accordance with another embodiment of the invention, a method for controlling a water level of a boiler drum of a HRSG system for a combined cycle power plant during start up is provided. The method includes measuring an actual boiler drum water level during start-up operation of the system. The method also includes measuring a vapor pressure within the boiler drum. The method further includes measuring a boiler drum metal temperature for determining water temperature within the boiler drum. Further, the method includes determining an optimum boiler drum water level during start up operation of the HRSG system based on a characteristic chart model and then comparing the optimal boiler drum water level and the actual boiler drum water level. Finally, the method includes controlling the boiler drum water level by supplying water into the boiler drum or blowing down water based on results of the comparison between the optimal boiler drum water level and the actual boiler drum water level.

In accordance with another embodiment of the invention, a HRSG system is provided. The system includes a boiler drum for containing water. The system also includes an economizer for providing heated water to the boiler drum. The system further includes an evaporator connected to the boiler drum using a multiple downcomer tubes and evaporator tubes. The system includes a superheater in a steam path for receiving a steam flow and producing a superheated steam flow. The system also includes a sensing system comprising multiple sensors for measuring a boiler drum water temperature, a vapor pressure within the boiler drum and an actual water level in the boiler drum. Finally, the system includes a controller for controlling the water level of the drum by supplying water into the drum or blowing down water based on a comparison between an optimal boiler drum water level and the actual water level of the drum during start up operation of the heat recovery steam generation system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present invention is generally directed to a combined cycle operation more particularly, to a method and system for controlling a boiler drum water level during start up operation of a HRSG system for a combined cycle power plant. As used herein, the phrase 'cold start up condition' refers to a low pressure in the boiler drum including a water temperature much lower than a saturation temperature of water during start up. Further the phrase 'hot start up condition' refers to a high pressure in the boiler drum including a water temperature nearly equal to the saturation temperature of water during start up. The method includes generating a characteristic chart model based on drum, evaporator and downcomer geometry and further based on multiple vapor pressures of the drum and multiple temperatures of a boiler drum metal at the time of the start up operation of the HRSG system of the combined cycle power plant.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
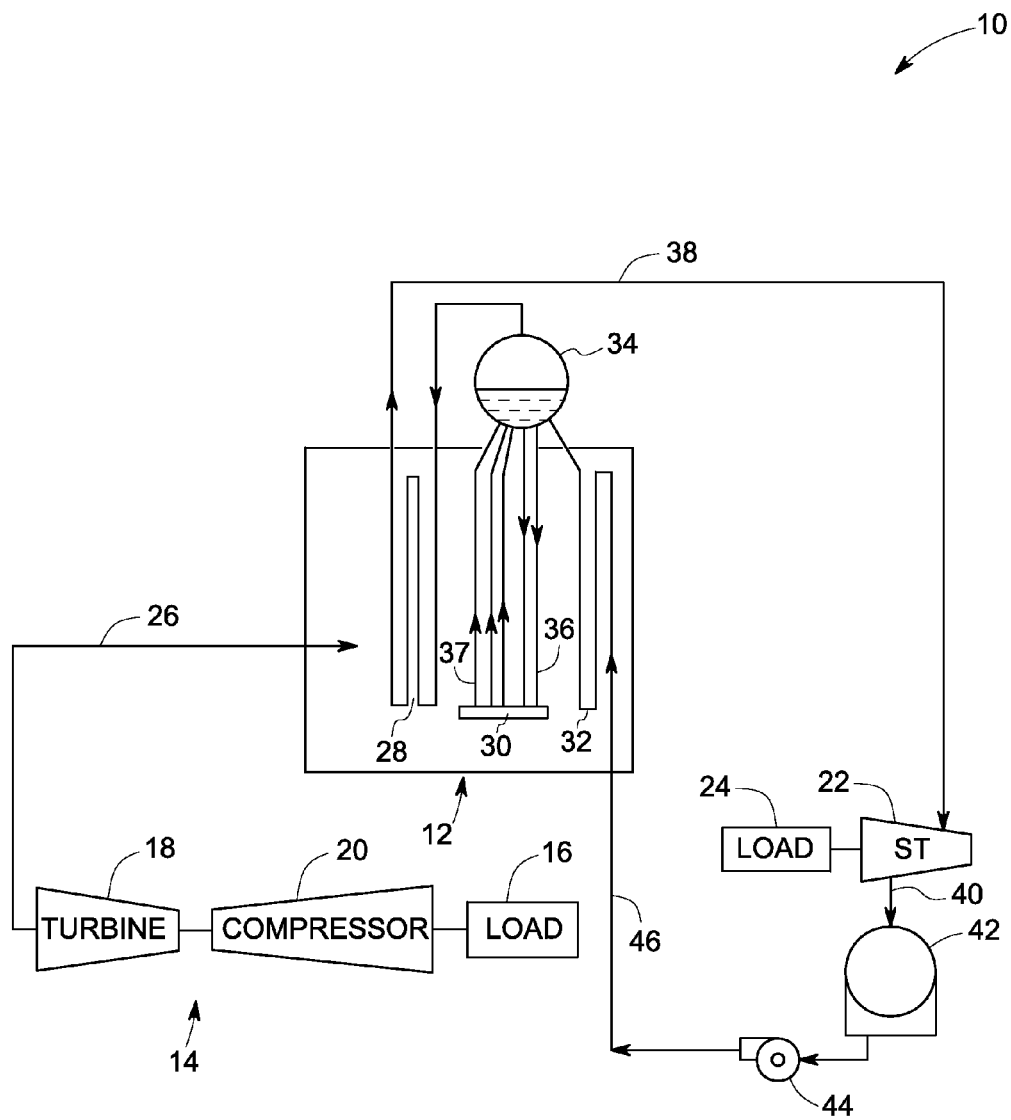
FIG. 1 is a schematic flow diagram of an embodiment of a combined cycle power generation system using a HRSG system.

FIG. 1 is a schematic flow diagram of an exemplary embodiment of a combined cycle power generation system 10 having a HRSG system 12. The system 10 includes a gas turbine 14 for driving a first load 16. The gas turbine 14 typically includes a turbine 18 and a compressor 20. The system 10 also includes a steam turbine 22 for driving a second load 24. In one embodiment, the first load 16 and the second load 24 includes an electrical generator for generating electrical power. In another embodiment, the first load 16 and the second load 24 includes other types of loads capable of being driven by the gas turbine 14 and steam turbine 22. In addition, the gas turbine 14 and steam turbine 22 may also be utilized in tandem to drive a single load via a single shaft. In one embodiment, the steam turbine 22 includes a low-pressure stage, an intermediate-pressure stage, and a high-pressure stage. However, the specific configuration of the steam turbine 22, as well as the gas turbine 14, may be implementation-specific and may include any combination of stages.

As illustrated in FIG. 1, the combined cycle power generation system 10 includes a multi-stage heat recovery steam generator (HRSG) system 12. The HRSG system 12 is a simplified depiction of a general operation and is not intended to be limiting. The HRSG system 12 receives hot exhaust gases 26 from the gas turbine 14 for heating water and steam. The typical HRSG system, aside from a duct through which the hot exhaust gases 26 pass, in its most basic form, includes three additional components: a superheater 28, an evaporator 30, and an economizer 32 or feedwater heater arranged in an order with respect to the flow of exhaust gases 26 in the duct. The HRSG system 12 includes multiple downcomer tubes 36 and multiple evaporator tubes 37. The economiser 32 and the superheater 28 also includes multiple tubes for water or steam flow in the HRSG system 12. Further, the HRSG system 12 includes a boiler drum 34. The function of the boiler drum 34 is to provide a stable amount of water to the evaporator 30 through the multiple downcomer tubes 36 and also to accumulate heat energy for compensating the changes in steam generated or consumed. Steam generated in the HRSG system 12 is supplied to the steam turbine 22 through a line 38. A generator (not shown) may be coupled to the steam turbine 22 for generation of electricity.

Furthermore, exhaust 40 from the steam trubine 22 is directed to a condensor 42. Condensate from the condenser 42 may, in turn, be directed into the HRSG 12 with the aid of a condensate pump 44 through a line 46. The condensate flowing through the economiser 32 is heated, but remains a liquid, and then fed to the boiler drum 34. The condensate may also be passed through a deaerator (not shown) before flowing into the economiser 32 for the removal of air and other dissolved gases. The water accumulated in the boiler drum 34 is then passed through the evaporator 30 for converting into saturated steam, and then through the superheater 28, which superheater 28 converts the saturated steam into superheated steam. In one embodiment, the HRSG system 12 may includes a low pressure stage, an intermediate pressure stage and a high pressure stage.

To maintain the safe operation of the boiler drum 34, the HRSG system 12 includes a boiler drum water level control system that has a controller for controlling the water level of the boiler drum 34 by supplying water into the boiler drum or blowing down water based on a comparison between an optimal drum water level in the boiler drum 34 and an actual water level of the boiler drum 34 during start up operation of the HRSG system 12. In one embodiment, the boiler drum 34 includes an optimum sized blow down valve for controlling the swell during start up operation of the HRSG system 12. The HRSG system 12 also includes a sensing system having multiple sensors for measuring the boiler drum metal temperature for determining the boiler drum water temperature, a vapor pressure within the boiler drum 34, and the actual water level in the boiler drum 34. The boiler drum water level control system determines the optimum boiler drum water level during start up operation based on a characteristic chart model as shown in FIG. 2.

Figure 2:
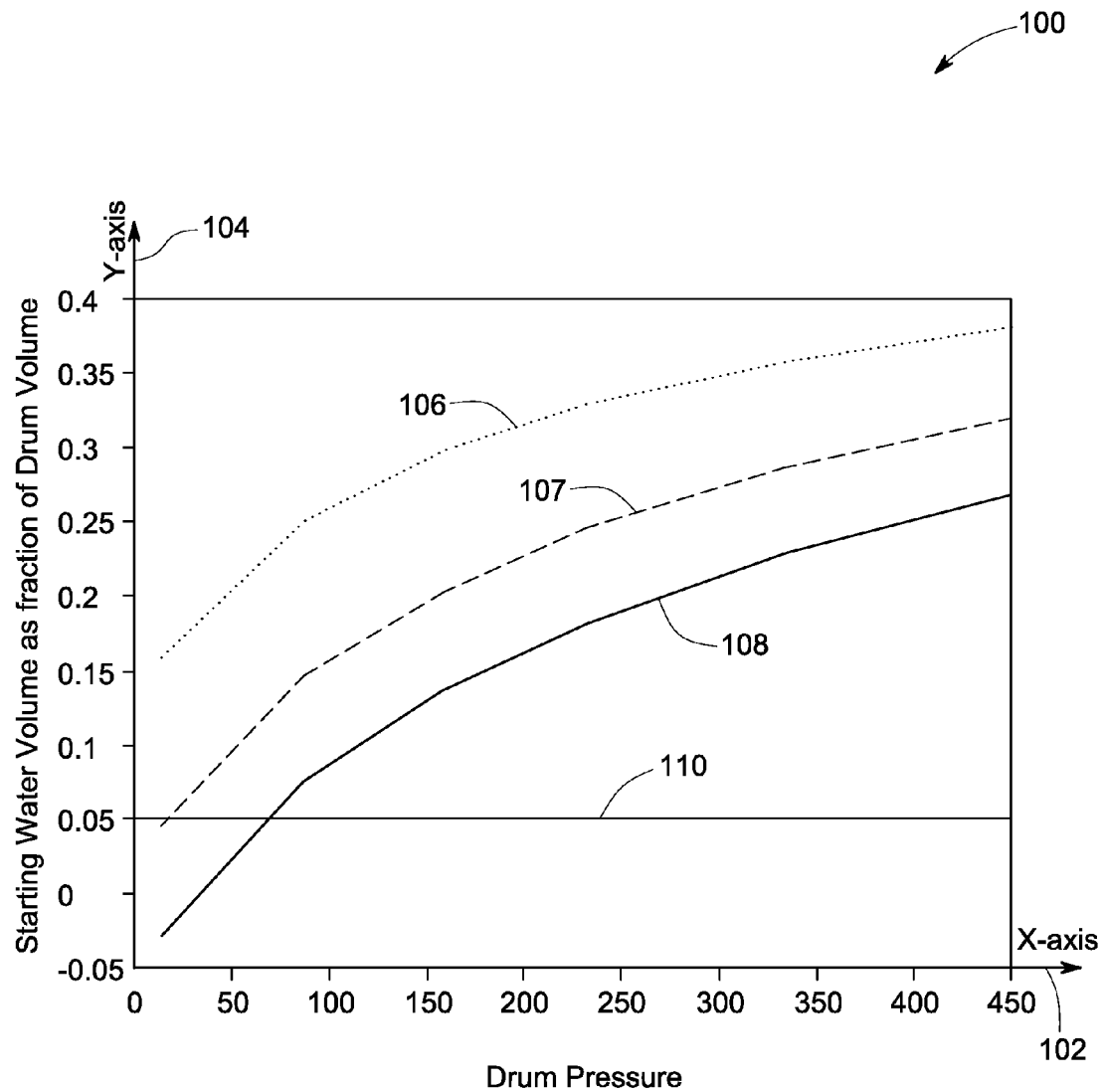
FIG. 2 shows a characteristic chart model 100 depicting multiple characteristic curves for determining optimum boiler drum water level during start up operation of a HRSG system for a combined cycle power plant.

FIG. 2 shows a characteristic chart model 100 depicting multiple characteristic curves based on steam quality that highlight a relationship between various start up water volume for a given boiler drum system as a function of drum pressure and temperature during start up operation of a HRSG system for a combined cycle power plant. The boiler drum system typically includes a boiler drum, multiple downcomer tubes and multiple evaporator tubes (boiler drum 34, downcomer tubes 36, evaporator tubes 37 as shown in FIG. 1). The X-axis represented by 102 shows various drum pressure. The Y-axis represented by 104 shows various starting water volume as fraction of boiler drum volume. The characteristics curves 106, 107 and 108 as shown are generated using water-steam mass balance equation that includes multiple parameters such as water density, steam density, boiler drum volume, downcomer volume (volume of downcomer tubes 36 as shown in FIG. 1), evaporator volume (volume of evaporator tubes 37 as shown in FIG. 1), steam quality at various boiler drum metal temperatures and boiler drum pressures during start up. It is to be noted that the boiler drum metal temperatures signifies the drum water temperatures and the boiler drum pressures signifies the vapor pressures within the boiler drum during start up operation of the combined power cycle generation system. As shown in the characteristic chart model 100, a characteristic curve 106 is computed for a drum metal temperature that is substantially below the saturation temperature. Thus, the characteristic curve 106 is a curve generated for a cold start up condition. The characteristic curve 108 is computed for a drum metal temperature that is substantially close to a saturation temperature. Thus, the characteristic curve 108 is a curve generated for a hot start up condition. It is to be noted that the drum metal temperature affects the steam quality in the boiler drum. As the steam quality increases, the characteristic curve 106 to the characteristic curve 108 represents increase in steam quality as shown in FIG. 2. In one embodiment, multiple characteristic curves may be generated for the characteristic chart model 100 based on multiple drum metal temperatures varying between the cold start up and the hot start up condition of the HRSG system. One such intermediate characteristic curve 107 is shown in between the characteristic curves 106 and 108. A line 110 shows a minimum safe water level in a boiler drum during start up operation. In a particular embodiment, the characteristic chart model 100 involves computations that are carried out using a processor.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the processor may be equipped with a combination of hardware and software for performing the tasks of the invention, as will be understood by those skilled in the art.

By way of an example, in a non-limiting manner, a water-steam mass balance equation used for the computation of the characteristic steam quality curves in the illustrated characteristic chart model 100 can be as follows:

$$M_{water}+M_{steam}|_{P_{drum0}} = M_{water}+M_{steam}|_{P_{drum0}+\Delta P} \quad (1)$$

The water-steam mass balance equation (1) is shown for different pressures ($P_{drum0}$ and $P_{drum0+\Delta P}$). Generic equations (2) and (3) of the mass of water and steam at $P_{drum0}$ and $P_{drum0+\Delta P}$ can be as follows:

$$M_{P_{drum0}} = (xV_{drum}+V_{downcomer}+V_{evap})\rho_w + (1-x)V_{drum}\rho_s \quad (2)$$

$$M_{P_{drum0}+\Delta P} = \rho_w(xV_{drum}+V_{downcomer}+(1-\overline{\alpha}_v)V_{evap}) + \rho_s(\overline{\alpha}_v V_{evap}+xV_{drum}) \quad (3)$$

The quantity 'x' is a water volume represented as a fraction of drum volume. The quantities of drum volume, downcomer volume, evaporator volume, water density and steam density are represented by $V_{drum}$, $V_{downcomer}$, $V_{evap}$, $\rho_w$ and $\rho_s$ respectively in the equations (1) and (2). The quantity $\overline{\alpha}_v$ is an average volume fraction that depends on water density $\rho_w$, steam density $\rho_s$ and steam-mass quality $\alpha_r$ at an exit of evaporator and is defined in a relationship as follows:

$$\overline{\alpha}_v = \frac{\rho_w}{\rho_w - \rho_s}\left(1 - \frac{\ln(1+\eta)}{\eta}\right), \quad (4)$$

where $$\eta = \frac{\rho_w - \rho_s}{\rho_s}\alpha_r$$

The steam quality $\alpha_r$ at an exit of evaporator changes with the drum metal temperatures. It is to be noted that the computation of the above mentioned equations (1), (2) and (3) is carried out on the basis of a few assumptions such as linear variation of steam quality in the evaporator, maximum boiler drum level occurring during change of drum pressure from about 100 psi to 150 psi and absence of steam in downcomer. This results in the multiple characteristic steam quality curves that are generated (for example curves 106, 107, 108 as illustrated in FIG. 2) and thereby formation of a characteristic chart model 100. Thus, the characteristic chart model 100 may be used to determine an optimum start up drum water level as a fraction of drum volume that provides for safe operation of the boiler drum.

Figure 3:
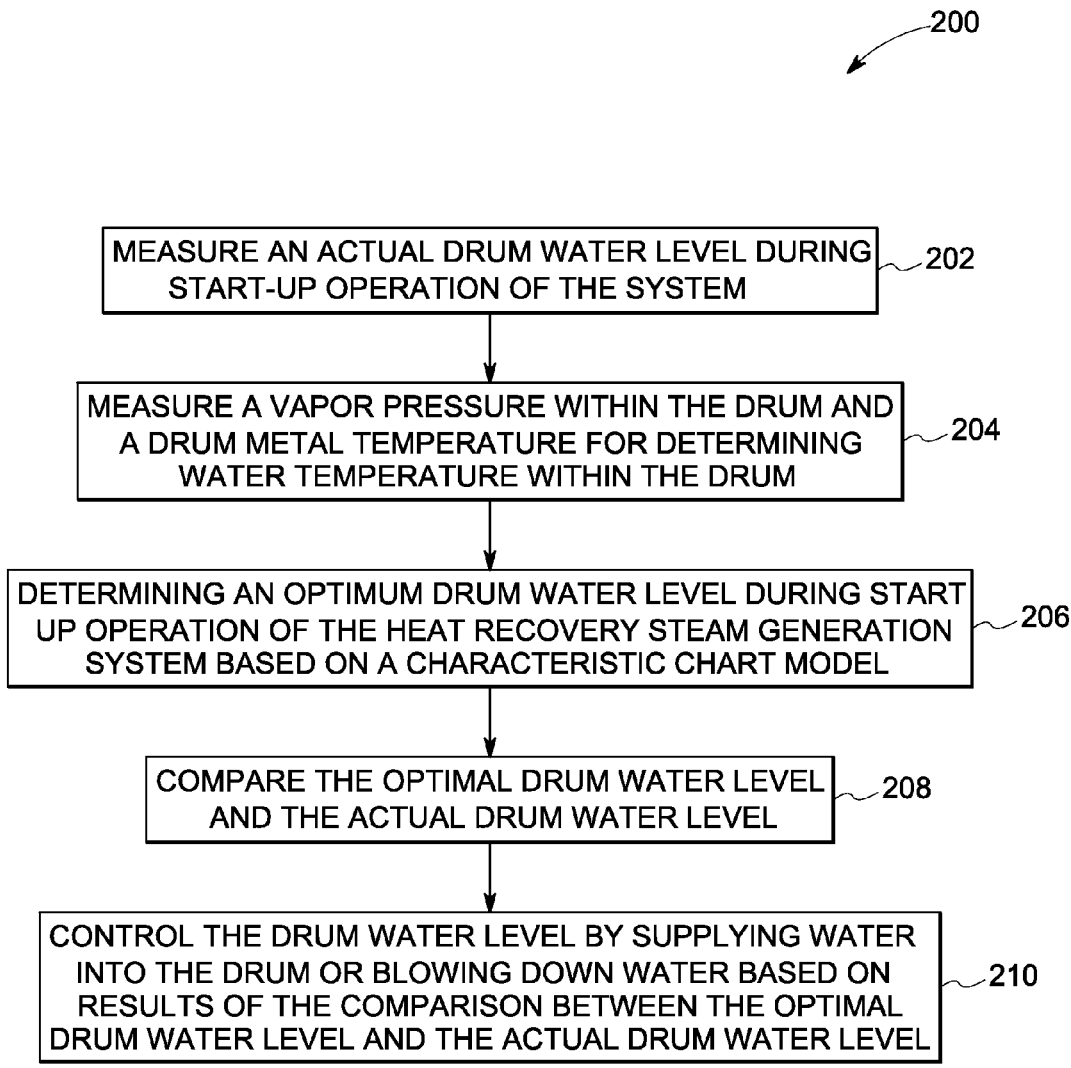
FIG. 3 is a flow diagram of a method for controlling a water level of a drum of a HRSG system for a combined cycle power plant.

FIG. 3 shows is a flow diagram of a method 200 for controlling a water level of a boiler drum of a HRSG system for a combined cycle power plant. At step 202, the method includes measuring an actual boiler drum water level during start-up operation of the system. At step 204, the method further includes measuring a vapor pressure within the boiler drum and a drum metal temperature for determining water temperature within the boiler drum. The HRSG system includes a sensing system for measuring the actual drum water level, the drum metal temperature and the vapor pressure within the drum. The method also includes comparing the measured drum metal temperature with a saturation temperature of water. Further, at step 206, the method includes determining an optimum drum water level during start up operation of the heat recovery steam generation system based on a characteristic chart model. As discussed above in FIG. 2, the characteristic chart model is based on multiple vapor pressures of the drum and multiple temperatures of drum metal at the time of the start up operation of the HRSG system. The characteristic chart model depicts multiple characteristic steam quality curves for various drum metal temperatures at different drum pressure during the start up operation. Therefore, the measured drum metal temperature and drum pressure at the start up helps to efficiently determine the optimum drum water level from the characteristic chart model during start up operation of the HRSG system. At step 208, the method includes comparing the optimal boiler drum water level and the measured actual boiler drum water level. Finally at step 210, the method includes controlling the boiler drum water level by supplying water into the boiler drum or blowing down water based on results of the comparison between the optimal boiler drum water level and the actual boiler drum water level. In one embodiment, the final boiler drum water level may also be controlled by manipulating the load rate of a gas turbine of the combined cycle power plant for slowing down boiling at an evaporator of the HRSG system. In another embodiment, the drum water level is controlled by using a supply of cold water into the boiler drum. It is to be noted that the cold water used may be lower than the drum metal temperature by about 30 to 40 degrees centigrade. The temperature of cold water is such that there is no occurrence of quenching of the boiler drum.

Advantageously, the present method and system according to one embodiment enables the determination of an optimum boiler drum water level during the start up operation of the combined cycle power plant. This enables controlling the water level of boiler drum in an energy efficient way by blowing down minimum possible hot water from the boiler drum during start up operation, thereby preventing heat losses. Furthermore, the present invention also provides for the generation of a characteristic chart model, which model helps in determining an optimal drum water level during start up operation based on a measured boiler drum metal temperature and a boiler drum pressure. This characteristic chart model enables determination of most appropriate boiler drum water level. This efficiently prevents the occurrence of swelling phenomenon in the boiler drum during start up and provides for the safe operation of the boiler drum.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for controlling a water level of a drum of a heat recovery steam generation system for a combined cycle power plant, the method comprising:

determining an optimum drum water level during start up operation of the heat recovery steam generation system based on a characteristic chart model;
   wherein the characteristic chart model is generated using based on a plurality of vapor pressures of the drum and a plurality of temperatures of drum metal at the time of the start up operation of the heat recovery steam generation system.

2. The method of claim 1, wherein the characteristic chart model depicts a plurality of water volumes as a fraction of the drum volume versus a plurality of drum pressures during start up operation of the heat recovery steam generation system.

3. The method of claim 1, wherein the characteristic chart model depicts a plurality of steam quality curves at different temperatures of the drum metal with respect to a plurality of saturation temperatures of water corresponding to the vapor pressures within the drum during start-up operation of the heat recovery steam generation system.

4. The method of claim 1, wherein the characteristic chart model is computed using a processor that processes a plurality of inputs based on the plurality of vapor pressures of the drum and the plurality of temperatures of drum metal at the time of the start up operation of the heat recovery steam generation system.

5. The method of claim 1, wherein the water level of a drum of a heat recovery steam generation system is controlled by using a water level control system.

6. A method for controlling a water level of a drum of a heat recovery steam generation system for a combined cycle power plant, the method comprising:
   measuring an actual drum water level during start-up operation of the system;
   measuring a vapor pressure within the drum;
   measuring a drum metal temperature for determining water temperature within the drum;
   determining an optimum drum water level during start up operation of the heat recovery steam generation system based on a characteristic chart model;
   comparing the optimal drum water level and the actual drum water level; and
   controlling the drum water level by supplying water into the drum or blowing down water based on results of the comparison between the optimal drum water level and the actual drum water level.

7. The method of claim 6, wherein the method comprises comparing the measured drum metal temperature with a saturation temperature of water.

8. The method of claim 6, wherein the characteristic chart model is generated based on a plurality of vapor pressures of the drum and a plurality of temperatures of drum metal at the time of the start up operation of the heat recovery steam generation system.

9. The method of claim 6, wherein the drum water level is controlled by manipulating the load rate of a gas turbine of the combined cycle power plant for slowing down boiling at an evaporator of the heat recovery steam generation system.

10. The method of claim 6, wherein the drum water level is controlled by using a supply of cold water into the drum.

11. A heat recovery steam generation system, comprising:
   a drum for containing water;
   an economizer for providing heated water to the drum;
   an evaporator connected to the drum using a plurality of downcomer tubes and evaporator tubes;
   a superheater in a steam path for receiving a steam flow and producing a superheated steam flow;
   a sensing system comprising a plurality of sensors for measuring a drum water temperature, a vapor pressure within the drum, and an actual water level in the drum, and
   a controller for controlling the water level of the drum by supplying water into the drum or blowing down water based on a comparison between an optimal drum water level and the actual water level of the drum during start up operation of the heat recovery steam generation system, wherein the controller is further configured to determine the optimum drum water level based on a characteristic chart model during start up operation of the heat recovery steam generation system.

12. The heat recovery steam generation system of claim 11, wherein the characteristic chart model is generated based on a plurality of vapor pressures of the drum and a plurality of temperatures of drum metal at the time of the start up operation of the heat recovery steam generation system.

13. The heat recovery steam generation system of claim 12, wherein the characteristic chart model is computed using a processor.

14. The heat recovery steam generation system of claim 12, wherein the system comprises a water level control system.

15. The heat recovery steam generation system of claim 11, wherein the drum comprises an optimum sized blow down valve for controlling the swell during start up operation of the heat recovery steam generation system.

* * * * *